(12) United States Patent
Fishman

(10) Patent No.: US 8,311,872 B2  
(45) Date of Patent: Nov. 13, 2012

(54) COMPUTER MODELING OF PROJECT MANAGEMENT PROCESS

(76) Inventor: Ilya M. Fishman, Palo Alto, CA (US)

(*) Notice: Subject to any disclaimer, the term of this patent is extended or adjusted under 35 U.S.C. 154(b) by 567 days.

(21) Appl. No.: 12/456,062

(22) Filed: Jun. 11, 2009

(65) Prior Publication Data

US 2009/0319323 A1 Dec. 24, 2009

Related U.S. Application Data

(60) Provisional application No. 61/132,521, filed on Jun. 19, 2008.

(51) Int. Cl.
*G06Q 10/00* (2012.01)

(52) U.S. Cl. ............. 705/7.27; 705/7.28; 705/7.26; 705/7.22

(58) Field of Classification Search .............. 705/7.22, 705/7.26, 7.27, 7.28
See application file for complete search history.

(56) References Cited

U.S. PATENT DOCUMENTS

2005/0096950 A1* 5/2005 Caplan et al. ............. 705/7

FOREIGN PATENT DOCUMENTS

WO    WO 2006138141 A2 * 12/2006

OTHER PUBLICATIONS

Pontrandolfo, Pierpaolo. "Project duration by stochastic networks by the PERT-path technique." International Journal of Project Management. 18.3 (2000): 215-222. Web. Jul. 20, 2012.*

* cited by examiner

*Primary Examiner* — Beth V Boswell  
*Assistant Examiner* — William Brockington, III  
(74) *Attorney, Agent, or Firm* — Bella Fishman

(57) ABSTRACT

Computer modeling process of project management based on Monte Carlo simulation of average quantum mechanical wave function of the project milestone predicting the project delay or project cost increase, based on presenting project milestones as superposition of wave functions of all tasks, averaged over multiple project samples, with each task's duration randomly distributed around its scheduled value.

5 Claims, 6 Drawing Sheets

COMPUTER MODELING OF PROJECT MANAGEMENT PROCESS

CROSS REFERENCE TO RELATED APPLICATIONS

The subject patent application is claiming a priority of Provisional Patent Application No. 61/132,521 filed in USPTO on Jun. 19, 2008.

FIELD OF THE INVENTION

This work relates to a computer modeling method of managing a project having multiple tasks and milestones.

BACKGROUND OF THE INVENTION

The fact that majority of commercial and government projects cost more and take longer than was initially planned is well known in the field of project cost and schedule management. The respective increase factor is ranging between about 30% and 100% depending on the nature of the projects. Self-consistent prediction of schedule probability and project cost remains unresolved problem of project management.

Commercial software packages conducting Monte Carlo simulations of project cost and schedules ("@Risk" from Palisade Corp., Oracle's "Crystal Ball" and others) require, as an input to the program, asymmetric probability distribution functions for project tasks or work breakdown structure (WBS) elements. Systematic positive difference is compulsory between the mean and most likely value of each task distribution function. These differences, unlike symmetric deviations that are strongly averaged for large groups of tasks, are summed as means contributing to the resulting distribution function and shifting it to longer times (or higher costs). Existing approach utilizes these asymmetric probability distribution functions as additional informational input needed before the statistical analysis starts. To provide statistically meaningful results, this approach requires multiple (thousands) simulations of the project schedule.

Additional information regarding task distribution functions needed for the statistical analysis and based on "expert's opinion" may become a serious drawback. The existing approach is suitable primarily for the later project stages when the project plan is stable, and tasks and their tolerances are well-defined. At the early stages, when the tasks are less certain, but major project decisions have to be made, an approach showing correct data tendencies for project cost and schedule, with very general assumptions on task durations or cost distribution functions, is in a great demand.

SUMMARY OF THE INVENTION

The description of this invention incorporates by reference to U.S. patent of the inventor of the subject patent No. U.S. Pat. No. 8,121,881 B2 issued on Feb. 21, 2012. The project WBS elements and respective project tasks are described in this work by wave functions, or probability amplitudes—the approach conventional for quantum physics. Similar to the project management method of referenced application, task wave functions are spread over the lull project time and an arbitrary time interval after the project ends.

Computer modeling comprises importing project file (for example, Microsoft project file) into a computer RAM, creating and storing a project file database in the computer RAM, analyzing the project file structure (association of project tasks, summary tasks and milestones), and analyzing probability of project milestones. To obtain milestone probability distribution, milestone wave function (sum of the task wave functions) is averaged over many milestone samples with tasks durations statistically varying around their mean values. The probability density described by averaged wave function exhibits a sharp peak around the milestone. Wings of probability are spread over both sides of the milestone and depend on the plan structure. Even if project has no risks, there is a final probability to complete some tasks before or after the milestone, with most significant contribution to probability related to long tasks.

The milestone probability density shifts to longer times (or higher costs) and the sharp peak decreases, when the external risk is final. This systematic milestone delay (or shift to increased project cost) is originated by non-random correlations of longer tasks. Milestone probability distribution is obtained by numerical inverse Fourier transform (NIFT) of random spectrum of the milestone.

BRIEF DESCRIPTION OF THE DRAWINGS

The foregoing aspects and advantages of the present invention will become better understood upon reading the following detailed description and upon reference to the drawings where.

DETAILED DESCRIPTION OF THE INVENTION

Figure 1:
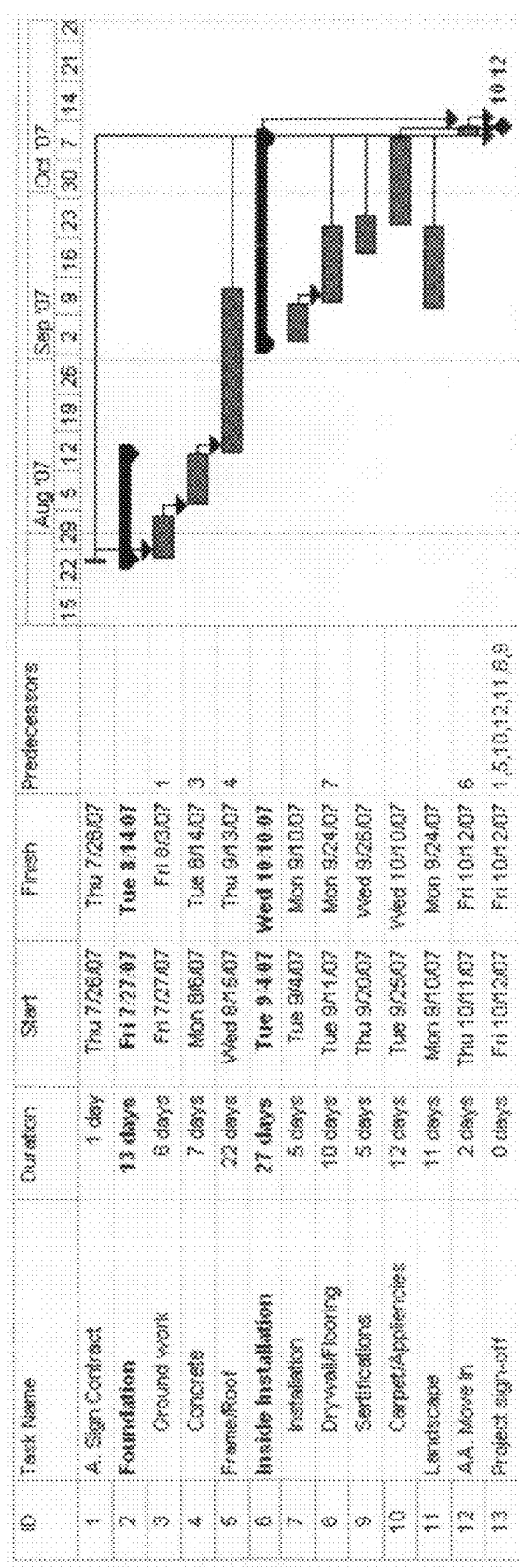
FIG. 1 (prior art) shows project format in Microsoft Project. Scheduled tasks are depicted as Gantt chart bars; milestone is shown as a rhomb.

The claimed approach may be demonstrated on an exemplary project plan to build a house consisting of 10 tasks, 2 summary tasks and 1 milestone (FIG. 1). The algorithm is applicable to arbitrary plan size. Each task is described by a wave function $\psi \sim \sin(2\pi t/T + \phi)$ where t is a project time, T is a task period and $\phi$ describes a task phase relation to the milestone. After the milestone, T equals task duration, and before the milestone the task period is defined by the condition of $\phi = \pi/2$ at the milestone point (round number of wave periods is squeezed between the task end and the milestone). One-sample probability density P of the milestone is defined as $P = |\Psi|^{-2}$ where milestone wave function $\Psi$ may be presented as $$\Psi = \sum_n \psi_n$$

where summation is conducted over all tasks associated with the milestone.

Figure 2:
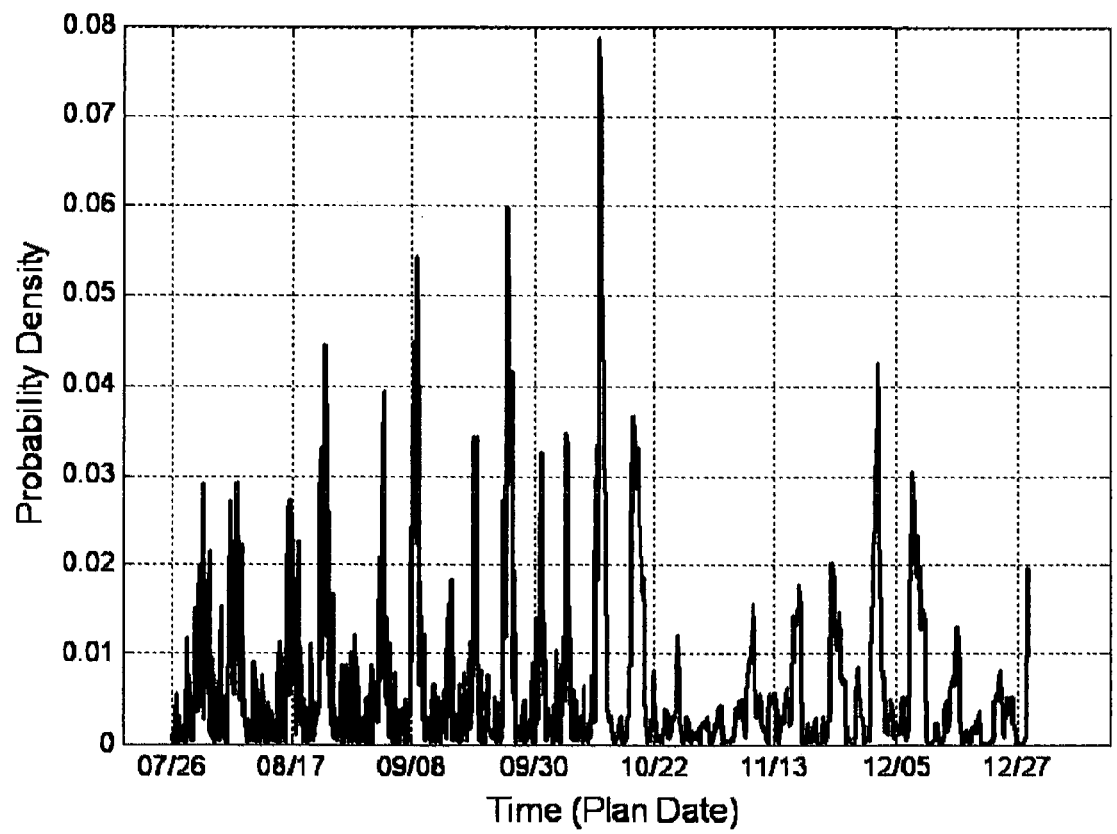
FIG. 2 (prior art) shows 1-sample probability density of the project milestone of FIG. 1.

FIG. 2 shows P(t) for the project of FIG. 1. The function P(t) exhibits a strong coherent peak having width fWidth~3 days at the milestone point (October 12 in the plan of FIG. 1 and on the horizontal axis of FIG. 2). In the vicinity of the milestone point, all wave functions behave like $\cos(2\pi t/T_n)$. In both directions from the milestone, the probability density quickly oscillates and behaves like "noise", but it has discrete spectrum of frequencies $\omega_n = 2\pi/T_n$ and hence is a periodic function of time. Noise-like behavior is a result of interference of wave functions with random periods. However, final value of fwidth~$\Delta$ (usually $\Delta$ has the same order of magnitude that the shortest project task) indicates that both the milestone itself and all tasks associated with it are defined with the final accuracy about $\Delta$. Hence, the milestone probability density $\overline{P}$ may be adequately presented as square of average wave function $\overline{\Psi}$, $\overline{\Psi} = \Psi_1 + \Psi_2 + \ldots + \Psi_M$, where M is a number of project samples, each sample having task durations randomly distributed within $\Delta$.

Figure 3:
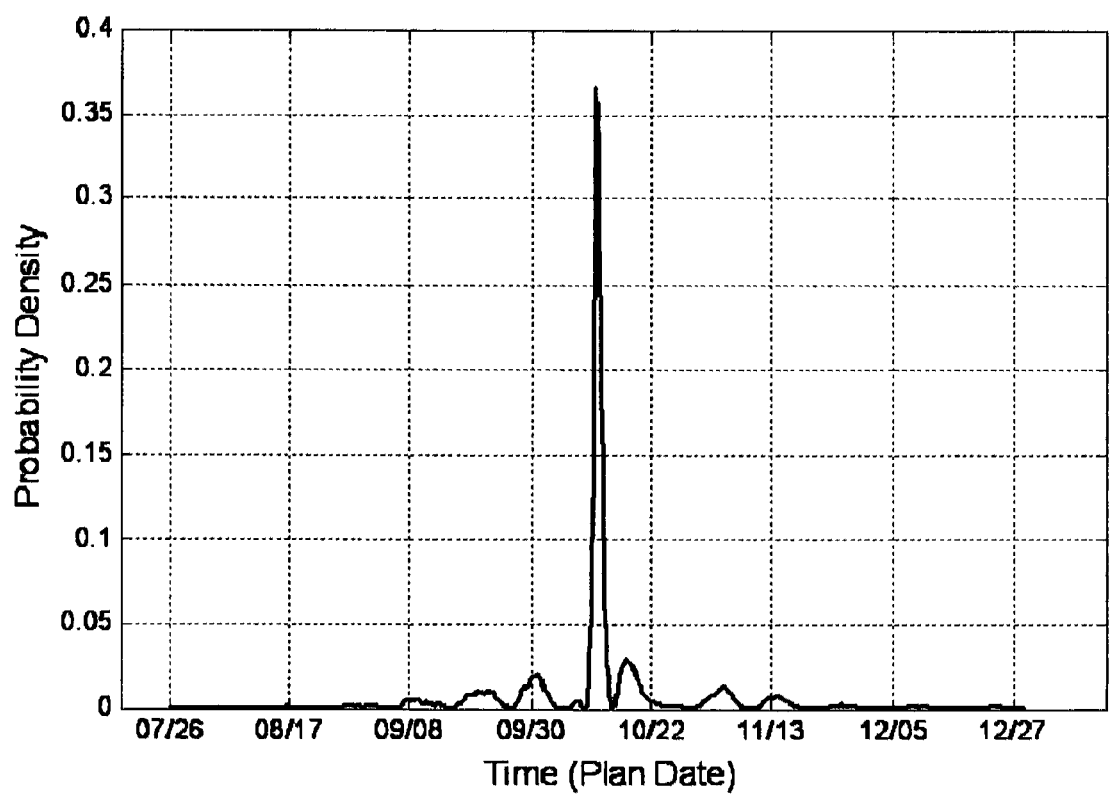
FIG. 3 shows probability density of the project milestone of FIG. 1 averaged over 200 samples; each sample has task durations randomly fluctuating within 3 days.

FIG. 3 shows the result of this averaging obtained by Monte Carlo simulations of 100 project samples with task durations normally distributed around their scheduled values with dispersion=$\Delta$. Probability density of FIG. 3 is a well-defined probability pattern centered around the milestone point. Efficiency of Monte Carlo simulations is higher than in conventional Monte Carlo analysis of project plans where many thousands of samples are usually needed to obtain statistically meaningful distributions. Beyond the strong probability peak around the milestone point, there are probability density "wings" (usually asymmetric) exponentially decreasing towards small and large t. Qualitatively, the diagram of FIG. 3 may be understood as an intensity pattern resulting from non-random interference of several tasks wave functions. All waves are coherently superimposed at the milestone point and randomly interfere elsewhere. If number of waves is N>>1 and all wave amplitudes=1, N waves build intensity $N^2$ at the milestone point and N in small and large t limits, $N^2$>>N. Next to milestone, there is an area of partial interference, where the tasks having longer periods contribute to the net non-random interference. Mathematically, FIG. 3 results from numerical inverse Fourier transform (NIFT) of the spectrum defined by task wave functions having spectrum of $\omega_n$ with each spectral line of frequency $\omega$ expanded into the band of frequencies $\delta\omega = 2\pi/(T \pm \delta T)$, $\delta T$ normally distributed with dispersion $\Delta$. After NIFT, continuous frequency spectrum is transformed, as expected, into a solitary pulse of correlation function, with major impact, beyond the milestone point, from partially coherent fluctuations of long wave tasks.

Figure 4:
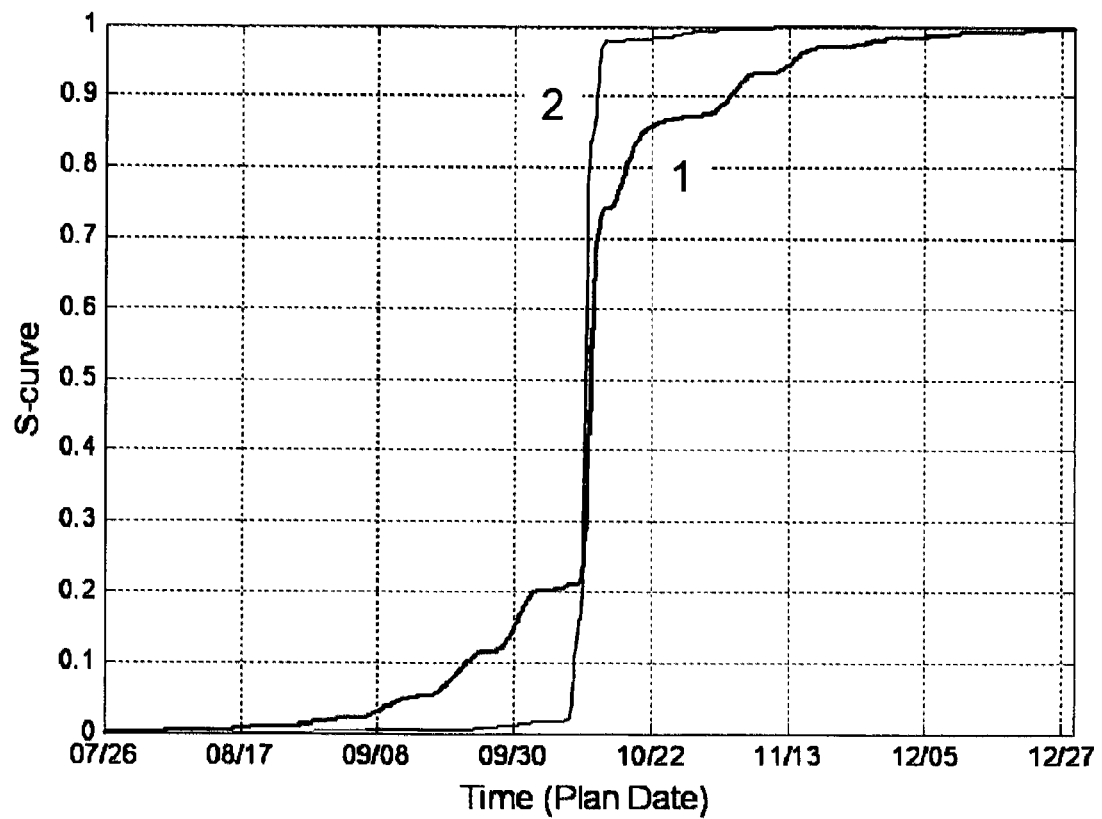
FIG. 4 shows S-curve for the project milestone of FIG. 1 (curve 1), and a project with more detailed tasks (curve 2)

These tasks with periods>>$\Delta$, which relatively long periods are only slightly disturbed by random $\pm\Delta$ variations primarily contribute to the probability density on both sides of the milestone suggesting that the longest tasks introduce the biggest uncertainty in the process of finalizing the project. When the diagram of FIG. 3 is integrated and normalized (FIG. 4, curve 1), the so-called S-curve is obtained characterizing the milestone probability to succeed. S-curve 1 shows that substantial probability (~26%) exists that the project will not be completed on time. Thus, the effect of milestone delay is explained entirely by the fact that some project tasks are relatively long, and the project risk caused by factors external to the project, may be neglected at this stage. The results of FIG. 3 and FIG. 4 are referred to as "schedule risk", or project uncertainty caused by lack of understanding of some project tasks in the planning process. The biggest uncertainty in the schedule is created by long tasks unknown with more detail at the planning time.

Schedule risk may be substantially decreased if tasks are sub-divided and hence understood better. Curve 2 of FIG. 4 is S-curve for the project where 10 tasks of FIG. 1 are sub-divided into 27 shorter sub-tasks keeping the same project milestone date and overall number of working hours. S-curve for this detailed project is much steeper, and the non-zero probability density beyond the milestone point is almost not visible. Roughly speaking, there is ~97% probability to complete the project on time. If tasks are sub-divided further (no long tasks left), the S-curve becomes almost a classical 0-to-1 step at the milestone point showing how the quantum model is self-consistently converting into a classical milestone model. In more detailed plans, probability density wings are narrower though the "mass" of tasks (amount of work to be done) stays exactly the same. The mechanism is that longer tasks, when averaged over many random samples, give more contribution to the correlation function than shorter tasks.

The sharp peak of FIG. 3 and steep probability increase of FIG. 4 describe the probability of milestone to occur as scheduled, and it is natural to consider the external project risk as set of factors preventing the project to be conducted as scheduled. In the quantum model, a different type of fluctuations of wave function parameters has to be specified to affect the mutual wave function correlations next to milestone. Obviously, these are phase fluctuations. In the above discussions, only the wave period fluctuations were considered but all phases were fixed at the milestone. Referring to real project, this is possible if the milestone point is kept in place no matter what durations the tasks have. This is possible only with "ideal" milestone management (if some tasks are delayed, their followers should be respectively contracted). In modeling real projects, task delays and contractions directly result in wave function shifts at the milestone, and relative compensation of phase shift may be achieved by more or less successful management. It seems reasonable to refer to the external project risk as a reduction of coherent maximum at the milestone point caused by fluctuations of wave function phases. When coherent maximum is intact, external risk is considered zero, and when it is fully destroyed, the external risk is maximized meaning that no tasks are going to be completed as were scheduled.

Figure 5:
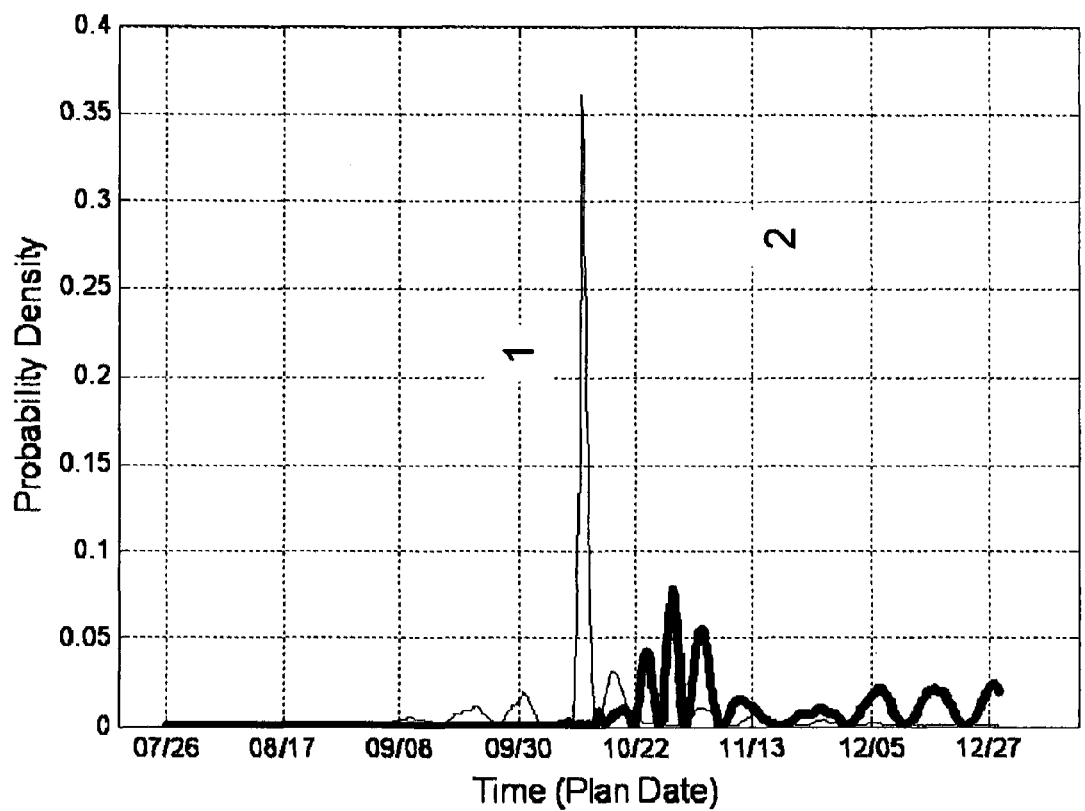
FIG. 5 shows probability density for the project milestone of FIG. 1 without external risk (curve 1, thin line) and with external risk (curve 2, thick line).

To measure risk severity, an appropriate scale of the external risk is introduced as a fraction of destroyed coherent peak. Phase and period fluctuations are strongly correlated: reduced task duration shifts the wave phase to shorter times, and increased duration—to longer times. Individual random phase durations are exactly symmetric and equally probable in both directions from the milestone. However, the NIFT correlation function for these fluctuations is strongly asymmetric: probability density pattern, as shown in FIG. 5, is shifted to longer times. The argument that qualitatively explains this probability density pattern is the same as the previous discussion of longer and shorted tasks for two S-curves of FIG. 4: the correlation function emphasizes mutual coherence of task elongations.

Figure 6:
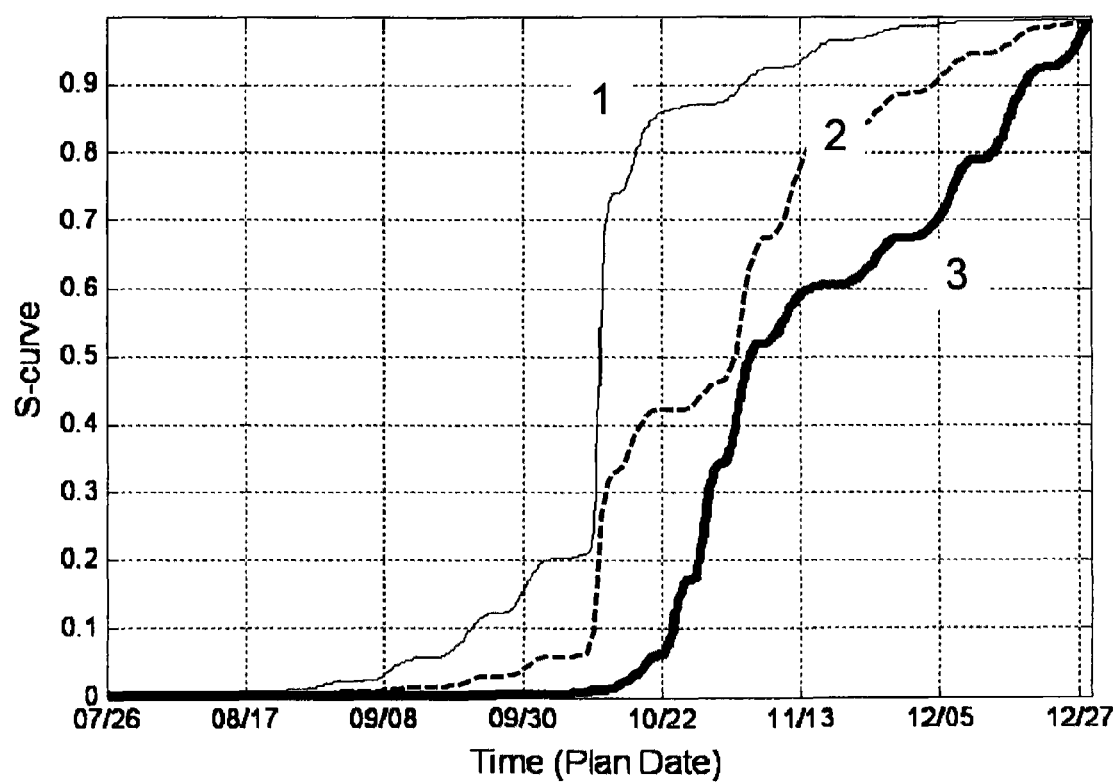
FIG. 6 shows S-curve for the project milestone of FIG. 1 without external risk (curve 1, thin line), with external risk reducing work done as scheduled by about 50% (dashed curve 2), and with maximum external risk (no work done as scheduled, curve 3, thick line).

FIG. 5 shows the correlation function for long wavelength fluctuations, which is substantially stronger than for the short wavelength fluctuations. The whole effect is a result of strong correlation of fluctuations of the wave periods and phases: elongations shift the milestone wave function to longer times, and contractions—to shorted times. When averaged over many project samples, only shifts to the longer times survive, and shifts to the earlier times almost totally disappear. This is the mechanism of systematic time and cost increase even if task duration distributions are fully symmetric. S-curves obtained by integration and normalization of probability density functions of FIG. 5 are shown in FIG. 6 by curves 1 and 3. Also, a dashed curve 2 shows the case of intermediate risk reducing the coherent milestone peak by about 50%.

Results of FIG. 6 suggest that the project milestone originally scheduled for October 12 is not expected, even in the absence of external risk, earlier than October 20 or even mid-November. If some tasks are affected by external risks, the milestone may be delayed at least until January of next year, or the project length might almost double. This forecast of significant project delay is made without any suggested asymmetry of probability distributions of task durations (these scheduled durations are normally distributed and hence fully symmetric). From the analytical point of view, the phenomenon of the project delay (or cost increase) is explained by strong correlation between the events when several relatively long tasks are randomly delayed; these delays strongly contribute to the correlation function and shift probability distribution to longer times.

What is claimed is:

1. A computer-implemented modeling process of managing a project having multiple tasks and milestones, each task being assigned to at least one milestone, the process comprising:

computer processing said tasks and milestones by:

presenting each said task by a quantum mechanical wave function;

presenting each said milestone as a sum of the task quantum mechanical wave functions;

defining temporal uncertainty for each milestone planned date;

applying a random distribution to each task in order to obtain a plurality of project samples for each milestone, wherein each random distribution has a dispersion equal to said defined temporal uncertainty for each milestone;

obtaining an average milestone wave function for each milestone by summing said plurality of project samples;

obtaining a milestone probability density for each milestone by squaring said average milestone wave functions for each milestone;

obtaining a probability of scheduled work completion for each said milestone by normalizing an integral of said probability density to unity; and managing the project by optimizing said probability of scheduled work completion for each milestone to be completed as scheduled.

2. The computer-implemented modeling process of claim 1, wherein a number of project samples of said plurality is defined by a requirement of predetermined accuracy of said probability density.

3. The computer-implemented modeling process of claim 2, wherein presenting the tasks by quantum mechanical wave functions reduces the number of project samples required to obtain predetermined accuracy of the milestone probability density.

4. The computer-implemented modeling process of claim 1, wherein optimizing said probability of scheduled work completion further comprises:

defining a schedule risk by assessing work that cannot be completed on schedule;

defining an external risk by assessing work that cannot be completed on schedule due to external factors; and re-planning the project for reducing said schedule risk and mitigating the external risk.

5. The computer-implemented modeling process of claim 1, wherein optimizing said probability of scheduled work completion further comprises:

computing statistical deviations of the project milestones from their said planned dates for different values of said task distributions from their mean values, and optimizing relative deviations of said tasks and milestones.

* * * * *